United States Patent [19]

Hurt

[11] Patent Number: 4,914,821

[45] Date of Patent: Apr. 10, 1990

[54] SIZER

[75] Inventor: Robert D. Hurt, Burlington, Iowa

[73] Assignee: Burlington Optical, Inc., Burlington, Iowa

[21] Appl. No.: 305,573

[22] Filed: Feb. 3, 1989

[51] Int. Cl.[4] ............................................. G01B 3/02
[52] U.S. Cl. ................................. 33/555.4; 33/561.2
[58] Field of Search ................ 33/175, 176, 179, 177, 33/507, 28, 200

[56] References Cited

U.S. PATENT DOCUMENTS

| | | | |
|---|---|---|---|
| 783,562 | 2/1905 | Zimmerman | 33/179 |
| 1,404,601 | 1/1922 | Gordon | 33/179 |
| 1,978,682 | 10/1934 | Marvin | 33/179 |
| 2,930,130 | 3/1960 | Ray et al. | 33/28 |
| 3,744,140 | 7/1973 | Kyrk | 33/179 |

FOREIGN PATENT DOCUMENTS 895806  4/1944  France ................................ 33/179

*Primary Examiner*—Harry N. Haroian
*Attorney, Agent, or Firm*—Henderson & Sturm

[57] ABSTRACT

A tool for measuring perimeters or circumferences of, for example, optical lenses. A base carries a measuring tape fixed at one end to the base and connected at its opposite end to a movable handle. The portion of the tape intermediate its ends forms a variable-dimension loop within which the item to be measured is placed. Movement of the handle in one direction tightens the loop about the item and the size is read on dimensional markings on the tape. The tool is designed to be hand-held and the handle is biased in such direction as to increase the size of the loop so as to render easier the placement of the item to be measured within the loop. The base, in an area substantially in register with the loop, has a cushion for receiving the item to be measured in non-slip fashion.

8 Claims, 3 Drawing Sheets

SIZER

BACKGROUND AND SUMMARY OF THE INVENTION

Various devices are known for measuring perimeters but these are mainly cumbersome and inaccurate, at least two disadvantages that cannot be readily tolerated when precision measuring or sizing is required, particularly in the optical field, as in the sizing of lenses for spectacles, for example.

According to the present invention, a simple, light-weight sizer is provided, capable of being easily held and handled during placement of the lens to be measured and further operable by one hand to tighten the sizing tape peripherally about the lens. The tool comprises a base on which is mounted a handle movable to vary the size of a loop within which the lens or comparable product is placed. The loop is part of a measuring tape or like element, one end of which is affixed to the base and the other end of which is attached to the handle. Another feature of the invention resides in the provision of a lid or cover which, in operative mode, overlies the looped tape and serves to stabilize the tape as well as to confine the lens in better fashion. The lid may be swung away to a displaced mode enabling removal and replacement of lenses. The tool is accurate in use, fool-proof and unlikely to get out of order.

Further objects and features of the invention will become apparent as the present disclosure progresses.

DETAILED DESCRIPTION OF A PREFERRED EMBODIMENT OF THE INVENTION

Figure 1:
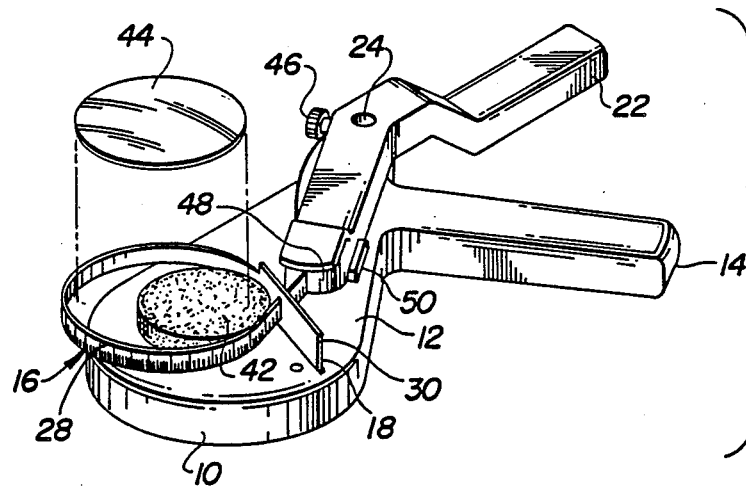
FIG. 1 is a perspective showing the basics of the tool and illustrating representatively the pre-positioning location of a lens to be measured.

The tool appears in a flatwise position in the drawings but, since it is a hand-held tool, its positions will vary during use. Nevertheless, its flatwise status permits easier description and it will be so treated, with the understanding that the components may have geographical attitudes other than as specifically shown and described.

Figure 2:
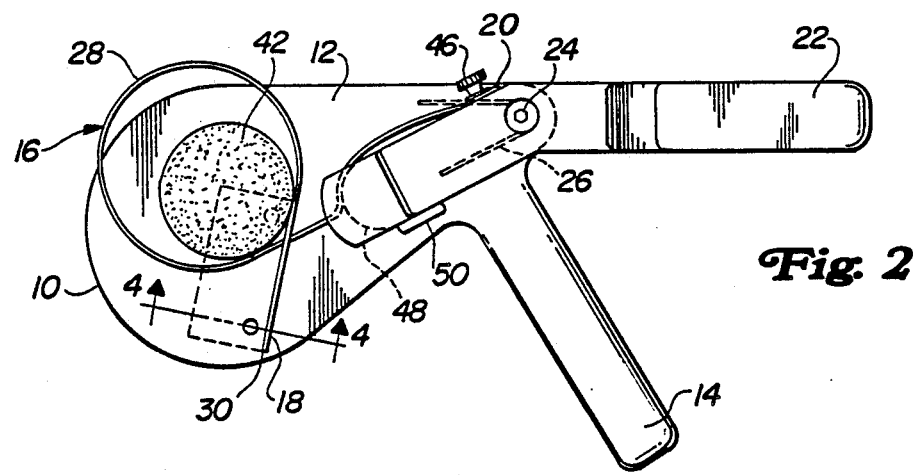
FIG. 2 is a plan of the tool without the lens.
Figure 3:
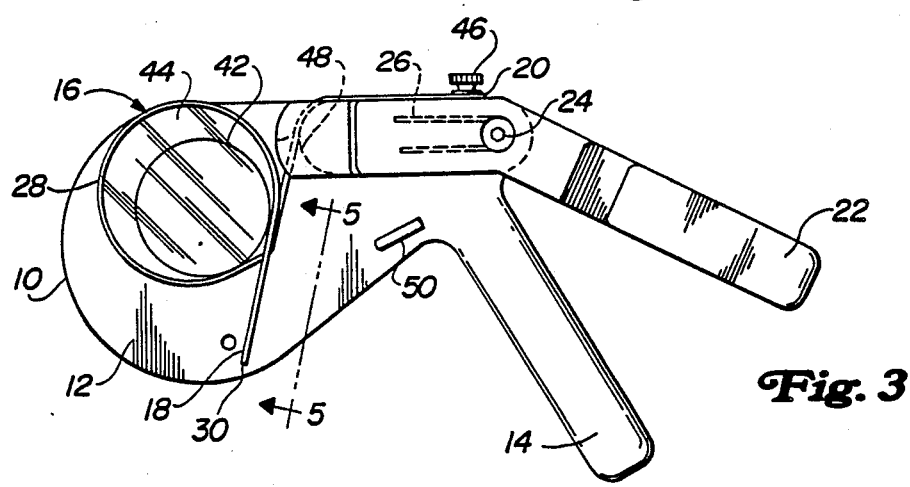
FIG. 3 is a similar plan but shows the lens in place to be sized.

So considered, the tool comprises a base (10) preferably shaped as shown and having a flat upper surface (12) and a fixed handle (14). The handle is preferably formed integrally with the remainder of the base, as from any suitable light-weight plastic or like material. The base carries on its top a flexible dimension-measuring element in the form of a tape (16) marked with appropriate gradations, for example, millimeters. The tape has one end (18) affixed to the base and an opposite end (20) attached to a movable handle (22). The handle (22) is pivoted to the base on a vertical axis, as by pivot (24) and a biasing means in the form of a hairpin spring (26) biases the handle to the position of FIGS. 1 and 2 where it forms a relatively wide V with the fixed handle (14), a relationship establishing a spacing such that the user can grasp the handles between the fingers and thumb of one hand, thereby to squeeze the handles together.

Figure 4:
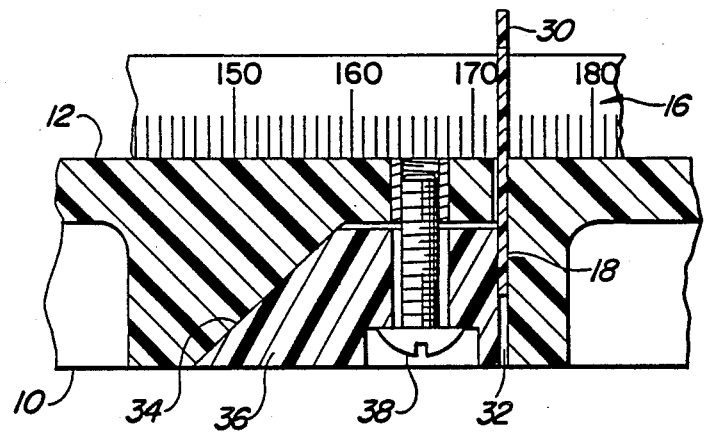
FIG. 4 is an enlarged section on the line 4—4 of FIG. 2.
Figure 5:
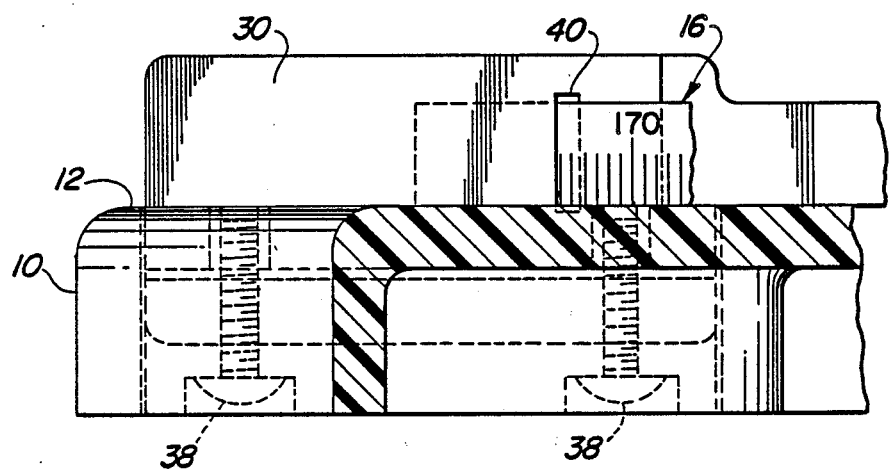
FIG. 5 is an enlarged section on the line 5—5 of FIG. 3.

The tape is arranged in such a manner that a portion thereof intermediate its ends (18) and (20) is configured as a loop (28) arranged so that its dimension changes in response to relative movement of the handles (14) and (22); i.e., as the handles are squeezed together, the loop contracts and vice versa. The fixed status of the end (18) of the tape is achieved by giving the tape a wider part (30) which is received in a cavity or pocket (32) in the base underside (FIG. 4). One face (34) of the pocket is sloped so that the pocket is upwardly convergent to receive a wedge-like block (36) which is held in place in the bottom of the base via suitable means such as screws (38). This arrangement grips the part 30 and leaves the wedge-closed cavity slightly open to the top of the base so as to receive the tape portion (30). The portion (30), being wider than the remainder of the tape, enables the provision therein of a slot (40) through which the narrower part of the tape is threaded, noose fashion (FIG. 5) so that the dimension of the loop (28) is varied as the handles (14) and (22) are moved relative to each other. The dimension exhibited by the tightened loop can be read at the slot (40) (FIG. 5). When the tape is installed, a slight clearance of about one millimeter should be left between the top of the base and the bottom edge of the tape.

A circular element (42) of relatively soft cushioning material is secured to the top of the base within the widest confines of the loop (28), any suitable adhesive, for example, being used as the securing means. The nature of the material of which the cushion is formed is such that its top surface affords a non-skid surface for preventing free sliding, etc., of a lens (44), for example, placed on the cushion within loop prior to manipulation of the handles (14) and (22).

The end of the tape attached to the movable handle (22) is secured to the handle as by a screw (46), and the end of the handle closer to the base has a portion (48) that not only retains the tape but serves also to increase the leverage on the tape via a wrap-around relationship as will be readily perceived. The screw 46 and those at 38 for the wedge block are easily removed and replaced for enabling replacement of the tape in the event of wear. This arrangement also facilitates manufacture and assembly of the tool. A stop (50) is formed integrally with and rises from the base to engage the handle (22) for limiting biased "open" position of the handle.

The use of the sizer is quite simple and convenient. The tool is held in one hand and the lens is placed on the cushion and within the loop with the other hand. The lens is preferably placed with its top facing upwardly. With a little practice it will be found easy to center the lens within the loop. With the lens properly placed, the handles are squeezed, the loop tightens accurately about the lens and the reading is taken on the tape as noted before.

Figure 6:
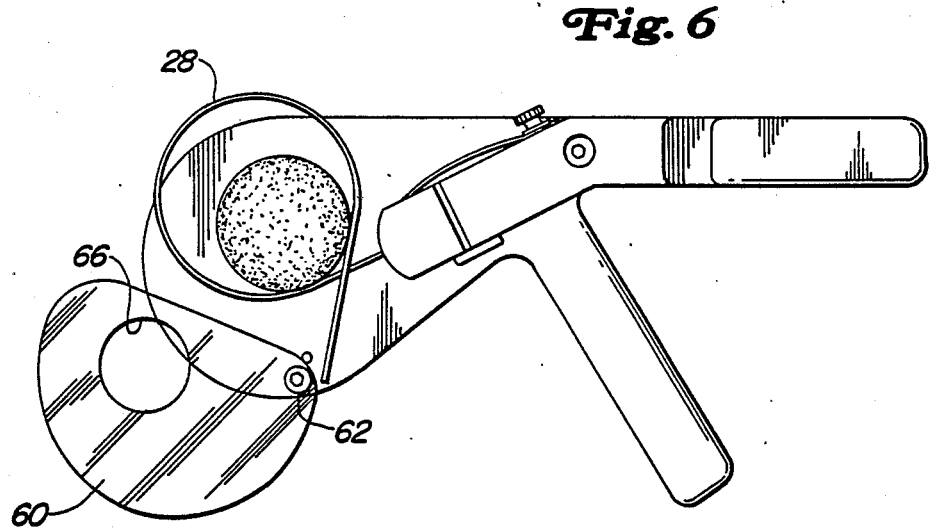
FIG. 6 is a plan of modification showing a lens cover in swung-away mode to enable placement of a lens to be measured.
Figure 7:
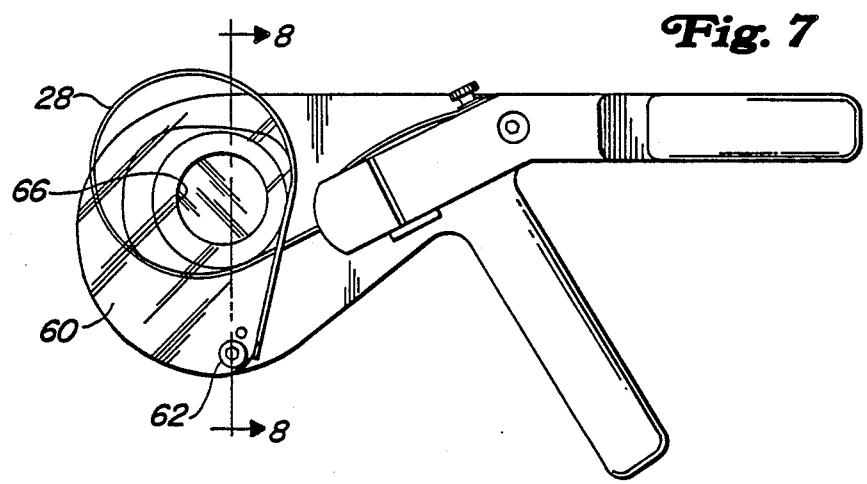
FIG. 7 shows the lens in operative mode as overlying the lens and tape loop.
Figure 8:
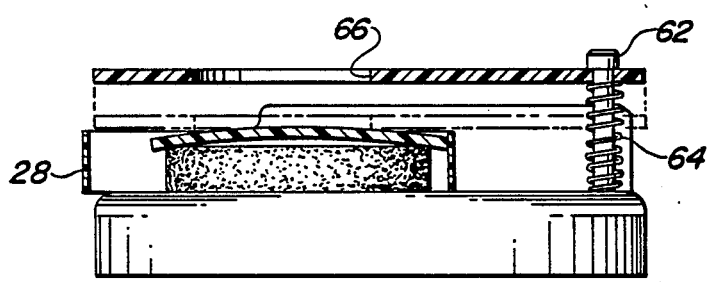
FIG. 8 is a section on the line 8—8 of FIG. 7 and shows the mounting of the lens lid.

In the modified form of the invention shown in FIGS. 6, 7 and 8, a lens and tape cover (60) is provided and is mounted on the base by means of a pivot (62) normal to the base. The basic parts of the sizer will be recognized without the repetition of reference numerals; although, the tape loop (28) will be numbered for easy reference to the function of the bi-positionable cover. The pivot is long enough to space the cover above the top of the base by a distance approximately equal to the height of the tape loop, but this distance is not fixed precisely because of the interposition of a coil spring (64) about the pivot and between the bottom of the cover and the top of the base, which spring serves as friction means for retention of the cover in either of its operative mode overlying the tape loop and lens (FIG. 7) and swung-away mode exposing the tape loop and lens (FIG. 6). The spring also enables the cover to be manually depressed to rest upon the top of the tape loop and thus stabilize the loop and to keep it from climbing over the lens as the loop is tightened. The cover has an opening (66) therein enabling access to the lens during the operative mode of the cover, as for adjusting the position of the lens, for holding the lens in place, etc.

Features and advantages of the invention, other than those pointed out herein, will readily occur to those versed in the art, as will many modifications in the preferred embodiment herein disclosed, all without departure from the spirit and scope of the invention.

I claim:

1. A sizer comprising a base, a flexible dimension-measuring element having a first end fixed to the base, a second end spaced from the first end and a portion intermediate the ends forming a variable-dimension loop overlying the base, a handle connected to the second end of the element and carried by the base for selective movement in one direction to contract the loop and in the opposite direction to expand the loop, and object-receiving means associated with the base for receiving within the expanded loop an object to be peripherally measured via contraction of the loop and including a member affixed to the base and having a substantially flat surface normal to the axis of the loop and exposed through the loop in a direction outwardly from the base.

2. A sizer according to claim 1, in which the member is composed of cushioning material.

3. A sizer according to claim 1, in which the base has a pocket therein receiving the first end of the element and wedge means is carried by the base and cooperates with the pocket to affix the first end of the element to the base.

4. A sizer according to claim 1, in which the element is a tape composed of material that is relatively rigid crosswise of the length of the tape and resiliently flexible lengthwise of the tape so that the loop is capable of a free-standing mode for receiving objects to be measured.

5. A sizer according to claim 4, including a cover carried by the base for selective positioning between an operative mode overlying the tape loop and a displaced mode away from and exposing the tape loop.

6. A sizer according to claim 5, in which the cover has an opening therein for access to the lens while the cover is in operative mode.

7. A sizer according to claim 5, in which the cover is carried by the base on a pivot for selective swinging between modes.

8. A sizer according to claim 7, in which friction means is operative between the cover and the pivot for releasably retaining the cover in either mode.

* * * * *